(12) United States Patent
Vacon et al.

(10) Patent No.: US 7,684,783 B1
(45) Date of Patent: *Mar. 23, 2010

(54) SYSTEM AND METHOD FOR AUTHENTICATING DEVICES IN A WIRELESS NETWORK

(75) Inventors: Gary Vacon, East Falmouth, MA (US); Floyd Backes, Sharon, NH (US)

(73) Assignee: Autocell Laboratories, Inc., Acton, MA (US)

( * ) Notice: Subject to any disclaimer, the term of this patent is extended or adjusted under 35 U.S.C. 154(b) by 1241 days.

This patent is subject to a terminal disclaimer.

(21) Appl. No.: 10/807,484

(22) Filed: Mar. 23, 2004

(51) Int. Cl.
*H04M 1/66* (2006.01)
*H04M 1/68* (2006.01)
*H04M 3/16* (2006.01)

(52) U.S. Cl. .............. 455/410; 455/411; 455/456.1; 455/562.1; 370/338; 370/352

(58) Field of Classification Search .......... 370/338, 370/352; 455/456.1, 562.1, 410, 411; 709/227; 713/150; 726/26
See application file for complete search history.

(56) References Cited

U.S. PATENT DOCUMENTS

| 5,345,595 | A | * | 9/1994 | Johnson et al. ............ 455/410 |
| 6,700,535 | B2 | * | 3/2004 | Gilkes et al. .............. 342/387 |
| 6,795,407 | B2 | | 9/2004 | Chesson |
| 6,870,815 | B2 | | 3/2005 | McFarland et al. |
| 7,149,208 | B2 | * | 12/2006 | Mattaway et al. ............ 370/352 |
| 7,212,828 | B2 | * | 5/2007 | Hind et al. ................ 455/456.1 |
| 7,212,837 | B1 | * | 5/2007 | Calhoun et al. ............. 455/560 |
| 7,286,833 | B2 | * | 10/2007 | Friday et al. .............. 455/456.1 |
| 2004/0042432 | A1 | * | 3/2004 | Riazi et al. ................. 370/338 |
| 2004/0103275 | A1 | * | 5/2004 | Ji et al. ..................... 713/150 |
| 2004/0114730 | A1 | * | 6/2004 | Koch et al. ..................... 379/9 |
| 2004/0122960 | A1 | * | 6/2004 | Hall et al. ................... 709/229 |
| 2004/0224637 | A1 | * | 11/2004 | Silva et al. ................. 455/63.4 |
| 2004/0255321 | A1 | * | 12/2004 | Matz ........................... 725/14 |
| 2005/0015496 | A1 | * | 1/2005 | Guo et al. ................... 709/227 |
| 2005/0102529 | A1 | * | 5/2005 | Buddhikot et al. .......... 713/200 |

\* cited by examiner

*Primary Examiner*—Quynh H Nguyen
(74) *Attorney, Agent, or Firm*—Anderson Gorecki & Manaras LLP

(57) ABSTRACT

A system and method for securing communications in a wireless network includes the steps of authenticating members of the wireless network, generating a member private key to be used by the members of the wireless network, and distributing the member private key to each of the members of the wireless network. A member is authenticated based on the ability of the member to be physically proximate to at least one other member of the wireless network at a given instant. The member private key is generated by one of the members, hereinafter referred to as a master member, in response to a changing value stored at the one of the members. The member private key is then securely distributed to each of the members in the WLAN network.

14 Claims, 8 Drawing Sheets

SYSTEM AND METHOD FOR AUTHENTICATING DEVICES IN A WIRELESS NETWORK

FIELD OF THE INVENTION

This invention relates generally to the field of wireless devices and more particularly to a method and apparatus for securing communication between two or more wireless devices.

BACKGROUND OF THE INVENTION

As it is known in the art, a Wireless Local Area Network (WLAN) is a local-area network that uses high-frequency radio waves or infrared links to communicate over an air link between coupled client devices. Because signaling is performed over an air link, the radio signals may be accessible to anyone capable of monitoring the air link, and thus there may be concerns regarding the privacy of data carried by a WLAN.

A variety of wireless communication environments exist. For example, an enterprise network may include hardware that permits each of the employees at a given corporate locale to communicate wirelessly with each other and a secured Local Area Network (LAN). In addition, WLAN use within homes is increasing, as vendors are providing more and more devices (such as television, stereos, etc.) which include WLAN communication functionality. With such an arrangement, a user connected to the home WLAN may control via one client device (for example a personal computer) the operation of any of the other coupled client devices.

In order to secure data that is exchanged between client devices in a WLAN network, various symmetric key encryption schemes have been defined and are continuing to be defined by standards bodies such as the IEEE to protect WLANs (this includes Wireless Equivalent Privacy (WEP), Temporal Key Integrity Protocol (TKIP), and Advanced Encryption Standard (AES)). It is generally recognized that symmetric key schemes will continue to evolve as the technology advances.

For example, WEP is designed to provide the same level of security to a WLAN network as that in a wired LAN. LANs are inherently more secure than WLANs because LANs are somewhat protected by the physicality's of their structure, having some or all of the network inside a building that can be protected from unauthorized access. Because communication in WLANs occurs over radio waves, WLANs do not have the same physical structure and therefore are more vulnerable to tampering. WEP aims to provide security by encrypting data over radio waves so that it is protected as it is transmitted from one end point to another.

According to the WEP protocol, when a client device is initialized into a WLAN network, it establishes communication with a router or a network Access Point (AP) and selects a WEP key. A user at the client device also copies the same WEP key into their client device. Further communications between the router/AP and the client device are then secured using the WEP key according to the WEP protocol.

Although the WEP protocol provides a mechanism for securing communication between clients in a WLAN, in use it can be cumbersome to the average user who knows little about proper key selection and the advantages of encryption. In addition, even if the user is capable of entering an appropriate WEP key, the process of WEP key initialization presents numerous opportunities for the key to be retrieved by a bad-faith client monitoring the air links. Thus, it is relatively easy for the security of the WLAN network to be compromised. It would be desirable to identify a straightforward method and apparatus for securing communication in a WLAN network which could be applied to any symmetric key encryption system.

SUMMARY OF THE INVENTION

According to one aspect of the invention, a method of authenticating a client device for coupling into a wireless network includes the steps of determining a distance between the client device and at least one other member of the wireless network, and authenticating the client device if the distance is within a predefined proximity range. With such an arrangement, a technique is provided for precluding access to a wireless network by an unauthorized party by ensuring that an authorized client in the wireless network is permitted to be physically proximate to at least one other wireless network member for at least an initialization period. Proximity may be proven by measuring RF signal strength or other RF parameters while knowing the characteristics of the transmitter, and/or proving by pressing buttons, touching a unit or other physical means that the user can physically touch the device to be Authenticated.

DETAILED DESCRIPTION

Figure 1:
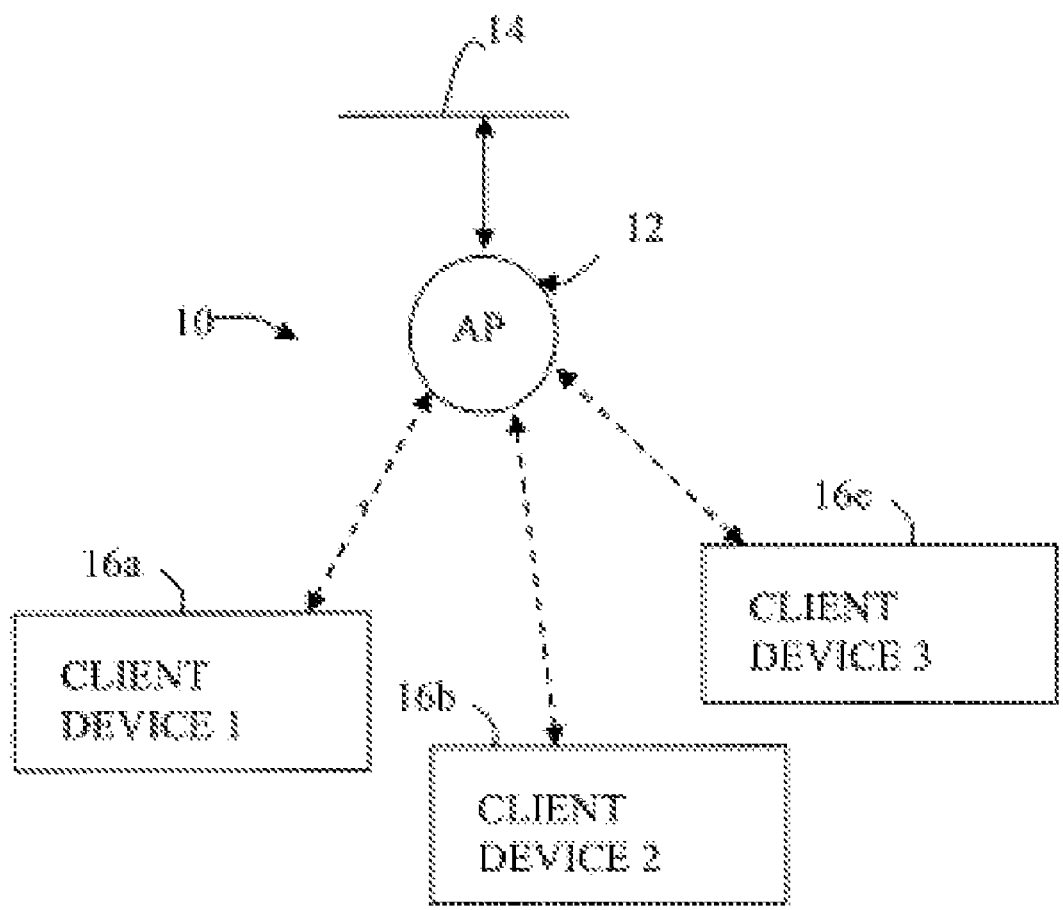
FIG. 1 illustrates an exemplary Wireless Local Area Network (WLAN) in which the present invention may be employed.

In accordance with the present invention, a system and method for securing communication between devices in a Wireless Local Area Network (WLAN) will now be described with reference to the attached figures. Referring to FIG. 1, a typical wireless communications environment 10 includes an access device 12 interconnecting a number of client devices 16a, 16b and 16c. The access device 12 is used to connect the wireless network to a wire-line LAN, thereby enabling communications between wireless devices 16a-16c and the communication medium 14. The access device 12 is referred to by various names depending upon the wireless architecture employed, and is herein referred to as an "access point" or "AP". The wireless devices 16a-16c also have various architecture dependent names and are herein referred to as "stations" (STAs), "clients" or "members" (of the WLAN 10).

Various types of wireless communications environments exist. Wireless communications environments include for example wireless data networks and wireless I/O channels. An example of a wireless data network is described in "IEEE Standard for Information technology—Telecommunications and information exchange between systems—Local and metropolitan area networks-Specific requirements—Part 11: Wireless LAN Medium Access Control (MAC) and Physical Layer (PHY) specifications—Amendment 1: High-speed Physical Layer in the 5 GHz band", incorporated herein by reference (hereinafter "802.11"). Furthermore, various different 802.11 "modes" are defined. For example, in IEEE 802.11 compatible wireless networks, wireless devices may be arranged in an "infrastructure mode", whereby the network is configured such that clients can 16a-16c communicate with each other only via AP 12, as shown in FIG. 1. 802.11 compatible devices may also be arranged in "ad-hoc" mode, whereby all the clients 16a-16c are within transmission range and can communicate directly with each other. Furthermore, wireless "mesh" technologies exist, whereby each wireless device acts as both an AP and a STA. Wireless I/O channels can be used to provide I/O communications, for example, between servers and storage devices via the "Bluetooth" Standard, or between home entertainment audio and video components, or between wireless telephone handsets and base stations. The various aspects of the invention apply to generally to wireless networking architectures, including those used in wide area networks, metropolitan area networks, enterprise networks, and home networks, and wireless I/O channel architectures, as they exist now and as they are developed.

One network in which the present invention may be employed is the Wireless Local Area Network described in pending U.S. application Ser. No. 10/781,228 entitled "Transmission Channel Selection Apparatus", filed Feb. 18, 2004, by Backes et al, (hereinafter the Backes application) and incorporated herein by reference.

The present invention provides a system and method for securing communication between clients in a WLAN using a combination of client authentication and encryption. In one embodiment, client devices are authenticated into the WLAN based upon a physical proximity to another wireless device in the WLAN during the authentication procedure. A system which authenticates based on proximity permits a user to directly control which users have access to the WLAN, by in essence requiring the network administrator to 'touch' each device that it intends to be part of the network. In one regard the network administrator acts as a security guard, physically indicating only those devices that are to be connected in a particular WLAN. Devices that do not have the required physical proximity during authentication are not permitted into the network.

In some embodiments it may be desirable to request the user to touch both devices for authentication. One can think of touch as providing a higher level of security. For example, it is possible, but unlikely, that a bad faith external client with a high gain antenna can make a device in one's residence "think" it is close to his device, but unless the client is able to gain access to the dwelling, he cannot, touch the device in the residence. However, the present invention does not require direct physical contact with each WLAN device, but also envisions that a device may be 'contacted' by a user via a radio or infrared signaling method. Various types of user actions that may initiate the authentication process between a pair of devices in a WLAN include the relatively simultaneous depressing of selected function keys, touch screens, etc, on each device, and the relatively simultaneous power-up of each device. In addition, the depression of a key with the intent to direct a signal from a device capable of executing the authentication and encryption methods of the present invention at a device to be included in the WLAN also denotes a user action. In addition, any other method that could be used to indicate a user's desire to include the device in the wireless network are encompassed herein, and the present invention is not limited to any particular type of user action.

According to another embodiment of the invention, once at least a pair of devices has been authenticated in a WLAN, a system and method is provided for establishing secure communication between devices in the WLAN using a shared private key. In one embodiment, as each pair of devices is 'touched' it generates a public key. The public key can either be used directly for the transfer of the shared private key, or alternatively the public keys of the devices are exchanged between the two devices, and used to derive a shared symmetric key for communication between the pair using known techniques such as the Diffie-Heilman or other similar algorithms. One of the devices of the pair is selected as a master device. The master device generates the private key that is to be used to secure communication between any of the devices in the WLAN. The master device encrypts the private key using the symmetric key, and forwards the encrypted key to the other device of the pair. The device decrypts the encrypted key, and saves a copy of the private key for communication with other devices as they are introduced into the system.

Once the first pair of devices is authenticated, the user can then authenticate other devices in the WLAN through the user actions described above. For example, authentication may be performed by establishing proximity between the new device and the WLAN, either by physically transporting the device to the WLAN, or transporting one member of the WLAN to the device. In one embodiment, a handheld device such as a remote or a fob may be used for the purposes of adding devices into the WLAN. Thus, a user could simply carry a remote around the house, and authenticate each device in the house that the user wishes to be part of the WLAN by using the remote or FOB to authenticate the device and transfer encryption information to the device to permit the device to securely operate in the WLAN.

For example, when using a FOB, the FOB always is the master, and uses the described techniques to generate a master key. When the FOB gets close enough to a system it wants to "KEY", and the user presses a button on the FOB, it sends a message to that device saying indicating that it wants to authenticate, or "KEY" the device. The device generates a public key and sends it to the FOB. The FOB checks that it only received one response, it received it in a short time window, and in fact, makes sure it heard no other energy on the channel, except for this single packet. The FOB also checks the CRC that has been dispersed throughout the packet. The FOB then uses the device's public key to send the symmetric master key to the device.

With such an arrangement, a user can build a secure network with confidence that no unauthorized user is able to access the data exchanged on the WLAN. Authenticating based on proximity ensures that rogue third party devices cannot easily be admitted into the network. Distribution of the private key using the above methods similarly assure that no keys can be inadvertently overheard by bad faith third parties.

According to another aspect of the invention, the public keys and private keys that are used in the present invention are generated automatically in a novel manner using data that is generated by measurements done by the device. The particular data that is used to generate the public and private keys is retrieved from one of the registers in the device. In particular, a register of the device is selected that has the characteristic of being periodically updated and unpredictable. Because the public key is retrieved from a register with unpredictable contents, the effect is that a truly random key may be provided for use in securing communications in the system. It should be understood that any register that stores data having the unpredictable quality may be used in the present invention. For example, one register that is provided in typical radio devices is a register which stores intermittent readings of the thermal noise in the environment surrounding the client device. The thermal noise values are generally used by a system to adjust signal strength transmit and receive operation at the device. However, the present invention uses the register contents to advantageously provide an unpredictable key value for WLAN communications. The register contents may be used to build a key of any size by merely appending register contents read at intervals to the existing bits of the key. By providing a mechanism for automatically generating a random key for data exchange, the need for manual key assignment is removed. In addition, because the keys are distributed in a secure manner, the security problems associated with prior art key distribution are overcome.

Figure 2:
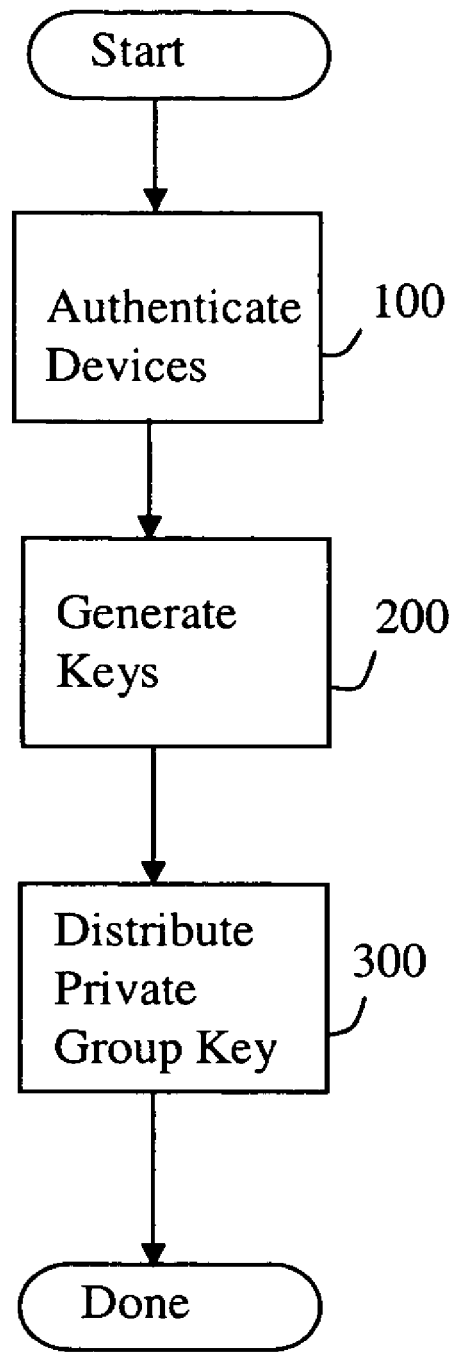
FIG. 2 is a flow diagram illustrating a number of exemplary steps that may be taken to secure the WLAN of FIG. 1.

Referring now to FIG. 2, the present invention identifies three stages of establishing secure communication between devices in a WLAN including an authentication stage 100, a key generation process 200 and a key distribution process 300. Each will now be described below in more detail. While the below concepts will be described below as though used together in a system, it should be understood that the present invention is not limited to a system that uses all of the concepts, processes and systems as described. For example, the authentication system of the present invention may be used alone, or in a system where encryption is performed differently. Similarly, the key generation mechanism of the present invention may be employed in any system wherein a random key is desired for security purposes. In addition, although a particular key distribution process is described below, it is known that there are myriad manners by which keys may be securely distributed. The below description is thus provided for purposes of illustration rather than limitation.

1. Authentication

Figure 3:
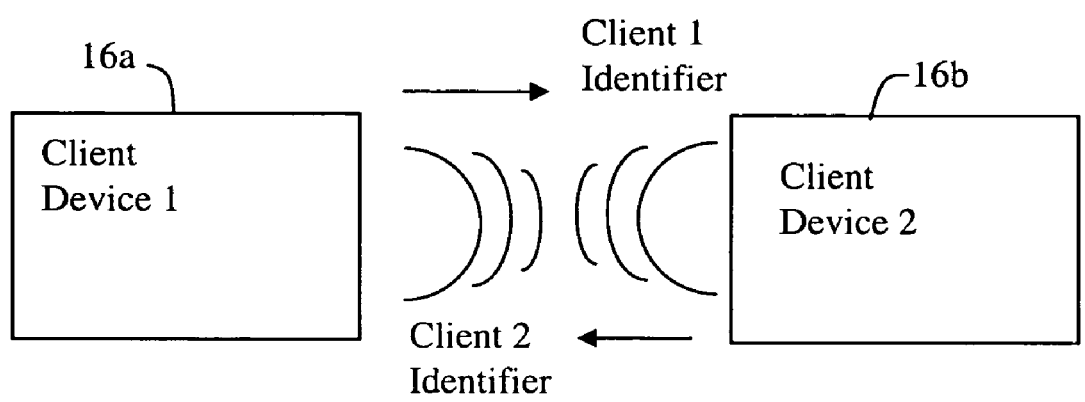
FIG. 3 illustrates a pair of wireless devices which use physical proximity determinations for authentication according to the present invention.

Referring now to FIG. 3, a diagram is provided for illustrating the communication between two devices seeking to authenticate in a WLAN. A user action causes device 16a to transmit a signal to client device 16b. Substantially simultaneously, client device 16b transmits a signal to client device 16a. The transmission of the signal is caused by a user action at each of the client devices. It is noted that the user action could be different at each device; thus a user could push a button at one device, and perform another action (execute a command at a command line interface, reboot the machine, etc.) at the other device. Thus the present invention is not limited to a user performing the same action at each device.

In one embodiment of the invention, the signal that is transmitted by each device is a low range radio signal. The signal may be, for example, a BID command or other Dynamic Radio Control Protocol Command, such as that described in the Backes application. Alternatively, a new command, such as a WLAN Join command would cause the authentication process to be initiated. It is noted that in addition to the command, other information such as the SSID of the devices may also be transferred.

Figure 4:
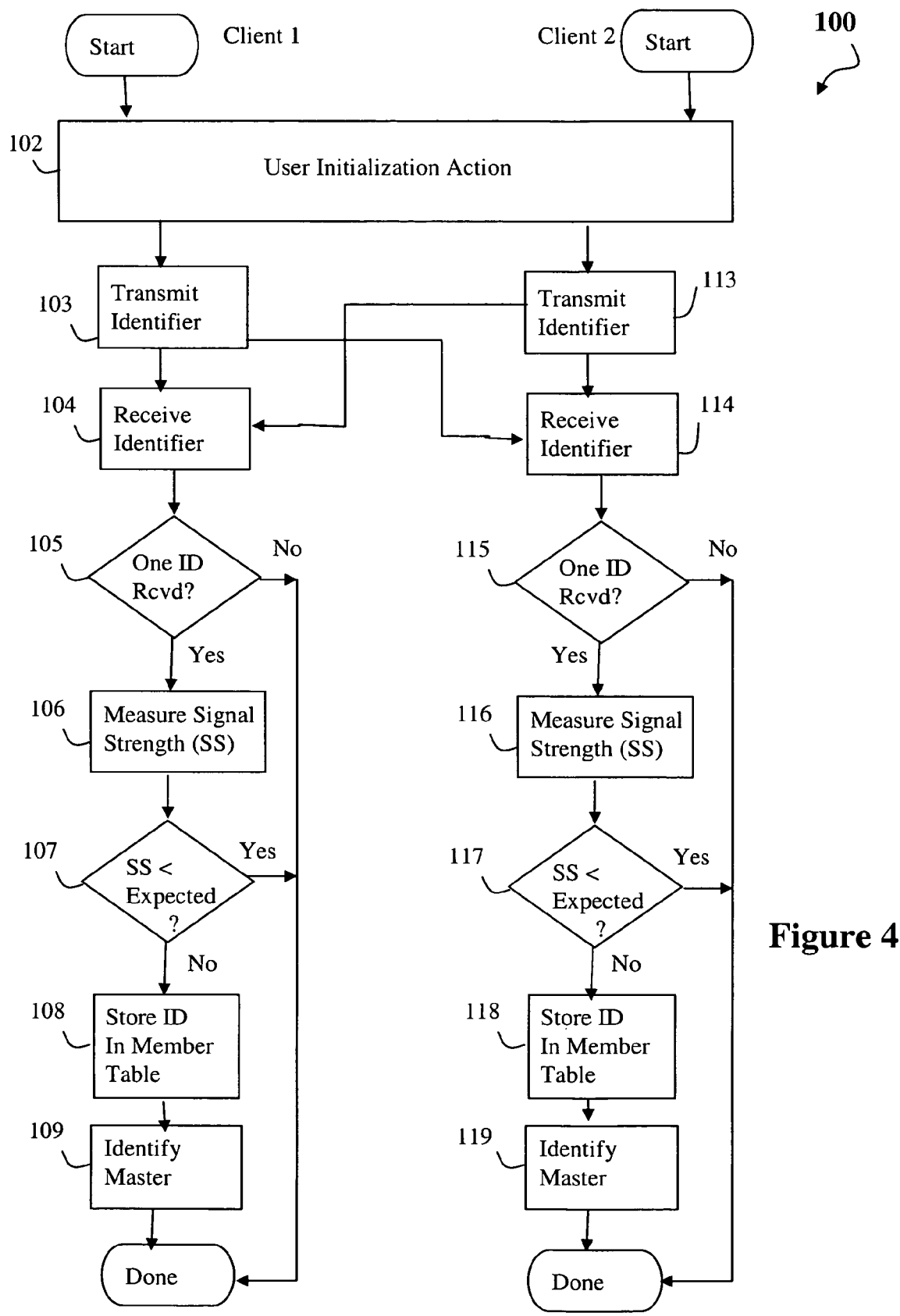
FIG. 4 is a flow diagram provided for illustrating several exemplary steps that may be taken to authenticate the pair of clients of FIG. 3.

Referring now to FIG. 4, certain steps of the authentication process will now be described in detail. At step 102, as mentioned above, the user action causes the authentication process to begin. At step 103/113, each device transmits its identifier, for example a MAC address, SSID, or other network management data, to the other device, and at step 104/114 each device waits to receive the identifier from the paired device.

In the interest of security to prevent unauthorized access to the WLAN, in one embodiment of the invention the authentication process is performed between only two devices at any time. This is to prevent another device which is out of the physical proximity of the user from maliciously accessing the WLAN by ensuring that the network administrator has direct control over which devices are being authenticated. During step 104/114, each client device waits for a certain predetermined time period to receive the identifier from the other device. After that time period, the process proceeds to step 105/115, where each device checks to make sure that only one identifier was received during the time period. If more than one identifier is received, then the client aborts the process. In fact, if substantial receive energy is detected, that cannot be decoded as a valid packet, some other entity may be trying to tamper with the exchange and the exchange is deemed invalid. Otherwise, the client proceeds to step 106/116, where the strength of the received signal is measured. As mentioned earlier, the transmitted authentication signal is selected to be a low range signal. If a client device seeking authentication is not proximate to the other client device, then the low range signal will not be received at the client, and authentication will not be accomplished. The present invention is not limited to any particular signal transmission power or distance range.

If at step 107 the signal strength does not indicate that the client is within an acceptable range, then the client is not authenticated. For example, in a home based WLAN network, the system could be designed such that any device that is external to the home is not permitted to access the WLAN. Thus, eavesdropping devices from neighboring apartments and the like would not be authenticated.

Once the devices are authenticated, at step 108/118 each device updates a member table within the device that stores the MAC addresses, SSID and other management information for each client. In one embodiment where only authentication is performed, the authentication process could now be complete. However, at step 109/119, in an embodiment that uses key generation and encryption as described in FIGS. 5-8, a master device in the WLAN needs to be identified. In one embodiment, a bit is stored in the member table to indicate which member of the WLAN is the master client. Other methods of indicating that one of the clients is a master may alternatively be used. If the master bit is set in the member table, then the master has already been selected, and no further action need be taken. However, if the clients are the first two clients in the network, the bit identifying a master is not set, and thus one of the first two authenticated clients is selected as a master for the purposes of key generation. The selection of which client is made a master can be accomplished in a variety of ways, including selecting a client having the lowest MAC address, selecting a client generating a lowest random number (potentially using the key generation steps of FIG. 5), giving priority to clients having certain functionality (for example, an AP would be selected as a master rather than a STA), etc. The present invention is not limited to any particular manner of selecting one of the clients as a master device. However, when the master client device is selected, the master bit in the member table associated with the client is set to indicate that a master has been selected. Following the identification of the master, the authentication process is complete.

2. Key Generation

Figure 5:
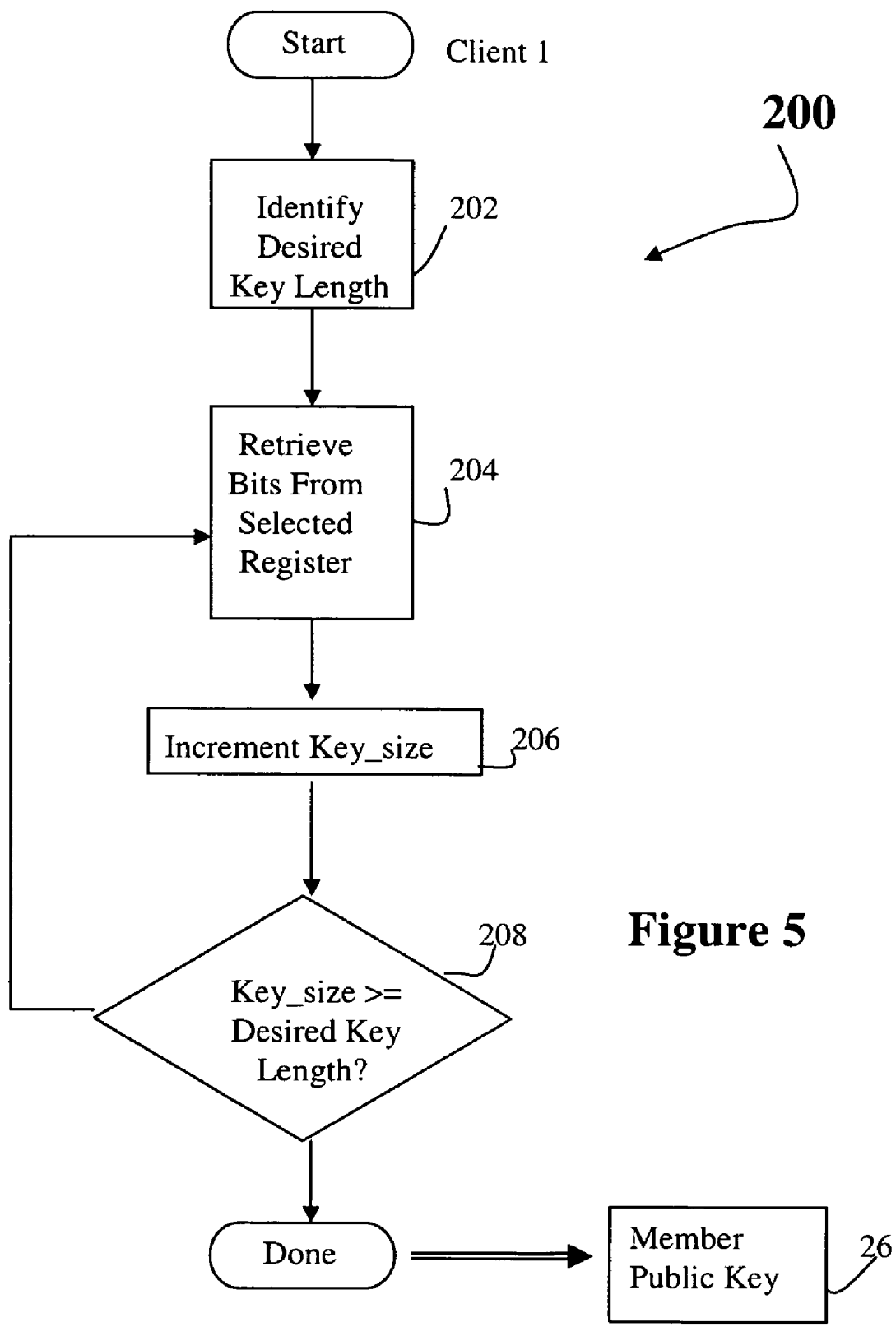
FIG. 5 is a flow diagram provided for illustrating several exemplary steps that may be taken to generate a key for wireless device communication according to the present invention.

Referring now to FIG. 5, exemplary steps in a process for generating a key that may be used for the purposes of encryption will now be described. At step 202, a key length is identified. In one embodiment the key length is selectable by the user, although it is also envisioned that the key length could be dictated by the protocol of the security running at the system, such as a 128 bit WEP key. It should be noted that because of the ease of generation of a random number of the key, the present invention may be used to easily provide a key of any desired length, without no increase in the complexity of the design.

Once the key length is identified, at least a portion of the key is obtained from the contents of a register in the device. As mentioned above, a register of the device is selected that has the characteristic of being periodically updated and unpredictable. Because the register stores data with unpredictable contents, and because the contents are continually modified, the effect is that a truly random key may be provided for use in securing communications in the system. Any register that stores data having the unpredictable quality may be used in the present invention. One register that is provided in typical radio devices is a register which stores intermittent readings of the thermal noise in the environment surrounding the client device. The thermal noise values are generally used by a system to adjust signal strength transmit and receive operation at the device. At step 204, a number of bits (the number being definable by the user to include all of some of the bits of the register) are used to populate the key. At step 206 a key_size variable, which maintains a count of the number of bits in the key, is incremented by the number of bits retrieved from the register. At step 208 it is determined whether the key_size is greater than or equal to the desired key length. If not, steps 204 and 206 are repeated until the entire desired key is populated with random bits. At this point, the key generation process is complete, and a key 26 is available for use in a system.

3. Key Distribution

Figure 6:
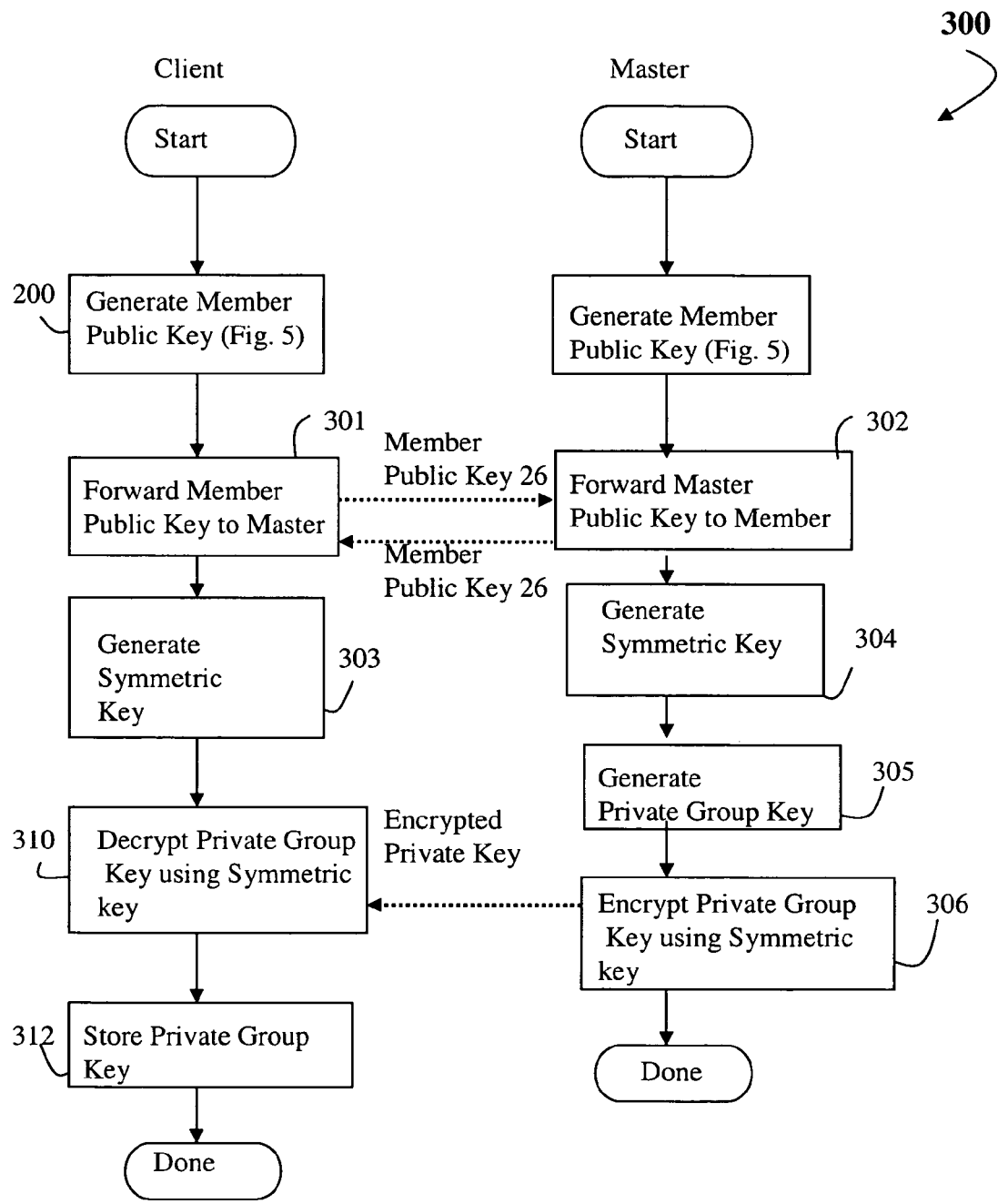
FIG. 6 is a flow diagram illustrating exemplary steps that may be taken at a client device and at a master device in a wireless network according to the present invention, for the purposes of distributing a private group key to members of the wireless network.

Referring now to FIG. 6, according to another aspect of the invention, exemplary steps that may be performed in a process of secure key distribution will now be described. In general, the method described in FIG. 6 uses concepts of the Diffie-Hellman key generation protocol known to those of skill in the art to generate a WLAN wide key that may be used by all clients in a system operating in either ad-hoc or infrastructure mode. Although symmetric key generation is described below, it should be understood that any public key system can be used for key distribution and the present invention is not limited to a particular key distribution method.

At step 200, each device generates a public key, for example by using the process described in FIG. 5. In FIG. 6, one device is assumed to be a client device, and one is a selected master client device. At steps 301 and 302, the clients exchange the public keys (key a for the client and key b for the master). Note that the public key transfer is a clear text key transfer. Previously to the key exchange, each of the devices had forwarded known values for parameters g and n, where parameter p is a prime number and parameter g (usually called a generator) is an integer less than p, with the following property: for every number n between 1 and p−1 inclusive, there is a power k of g such that $n=g^k \bmod p$.

In FIG. 6, assume that the second client device has been selected as the Master device. At steps 304 the master receives the public key a of the client and generates a symmetric key equal to $g^{ba}=(g^a)^b \bmod p$. and at step 304 the client receives the public key b of the master and generates a symmetric key equal to $(g^{ab}=(g^b)^a \bmod p$. Since $g^{ab}=g^{ba}=k$, the client and master now have a shared symmetric key k which can be used to securely exchange information.

At step 305, the master then generates the private key that is to be used for all communication in the WLAN. The key may be generated using the process described in FIG. 5, and is stored in a register at the device as the member private key. At step 306 the master encrypts the member private key using the symmetric key k, and forwards the key to the client, who decrypts it at step 310. At step 312 the client stores the member private key, and the process of key distribution to that client is completed.

As other clients are authenticated into the WLAN, each will also generate a public key, establish a symmetric key from one of the other WLAN devices, and retrieve the member private key for WLAN communication.

Man in the Middle Attacks

According to another embodiment of the invention, communication security during the described authentication and encryption steps can be further enhanced using a novel checksum distribution mechanism. In particular the checksum distribution mechanism can be used to hinder the so-called 'man in the middle' attacks.

Man in the middle attacks occur when a bad faith third party intercepts transmissions between two parties, and falsely represents himself as one of the intended parties in the communication. For example, using the authentication techniques above, suppose a device A sends a signal to a device B that it wishes to authenticate as a network member. A bad faith device C monitors the communication. When device B forwards its identity information and public key to device A, the packet has a generally defined structure illustrated in FIG. 7A, including a header 42, payload 44 and Cyclic Redundancy Check (CRC) 46. The CRC is a checksum of the data forwarded in the packet. At destination device A, the checksum of the payload of the packet is calculated and compared against the transmitted CRC value. A mismatch between the two indicates that one or more bits was corrupted during transmission, and the receiving device ignores the transmission.

In a man in the middle attack, the device C may monitor the communication between A and B. As device B forwards its CRC, device C may jam the frequency at which B is forwarding the data while the CRC is being sent, causing the CRC to be corrupted, and the packet to be ignored at A. Device C, however, has obtained the public key and other network information regarding device B. Thus, device C can then re-initiate communications with device A, posing as device B, and receiving data intended for device B.

Figure 7A:
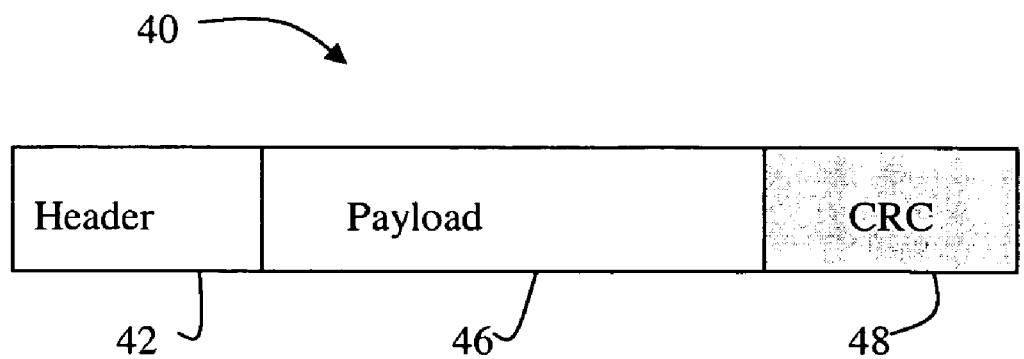
FIGS. 7A and 7B illustrate a modification of checksum data placement within the payload of a packet for the purpose of hindering communication interference from a man in the middle attack.
Figure 7B:
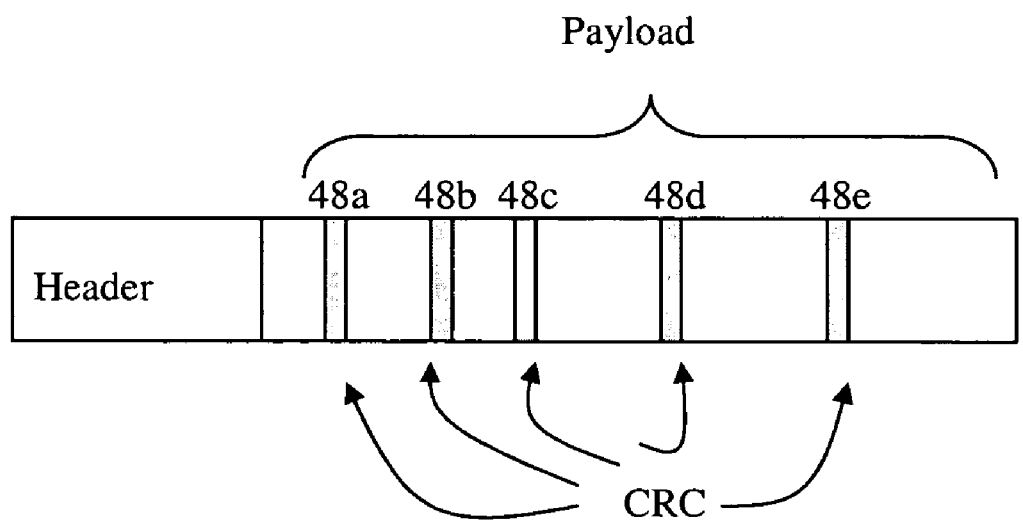

According to one embodiment of the invention, in order to hinder the man in the middle attack, the CRC bits of the payload are distributed throughout the payload in a predetermined pattern known to both the sending and receiving device. Any manner of distribution of the bits, including on a byte boundary, word boundary, or at pseudo-random or varying intervals is envisioned herein, and the arrangements of bits in the payload is not a limitation of the present invention. Such a distribution of CRC bits is shown in FIG. 7b, where the CRC groupings 46a, 46b, etc., each include one or more bits of the CRC. Distributing the CRC throughout the payload in this manner has the advantage that the bad faith party cannot easily jam a small number of bits in a communication. In fact, since most wireless data communications systems use multibit symbols, it is not possible to jam one bit at a time. Thus, if the offending device attempts to jam individual bits of the CRC, there is a high probability that other data that the device needs to impersonate the sending device will be lost. While the transmission between device A and device B may still be corrupted, the offending device will not be able to impersonate either party.

As mentioned previously, the above approach to distributing CRC bits may be used in the authentication or key distribution steps described above. In addition, it is envisioned that this method could be used to secure any type of communication between two devices, and thus is not limited to any particular packet type or communication protocol.

Figure 8:
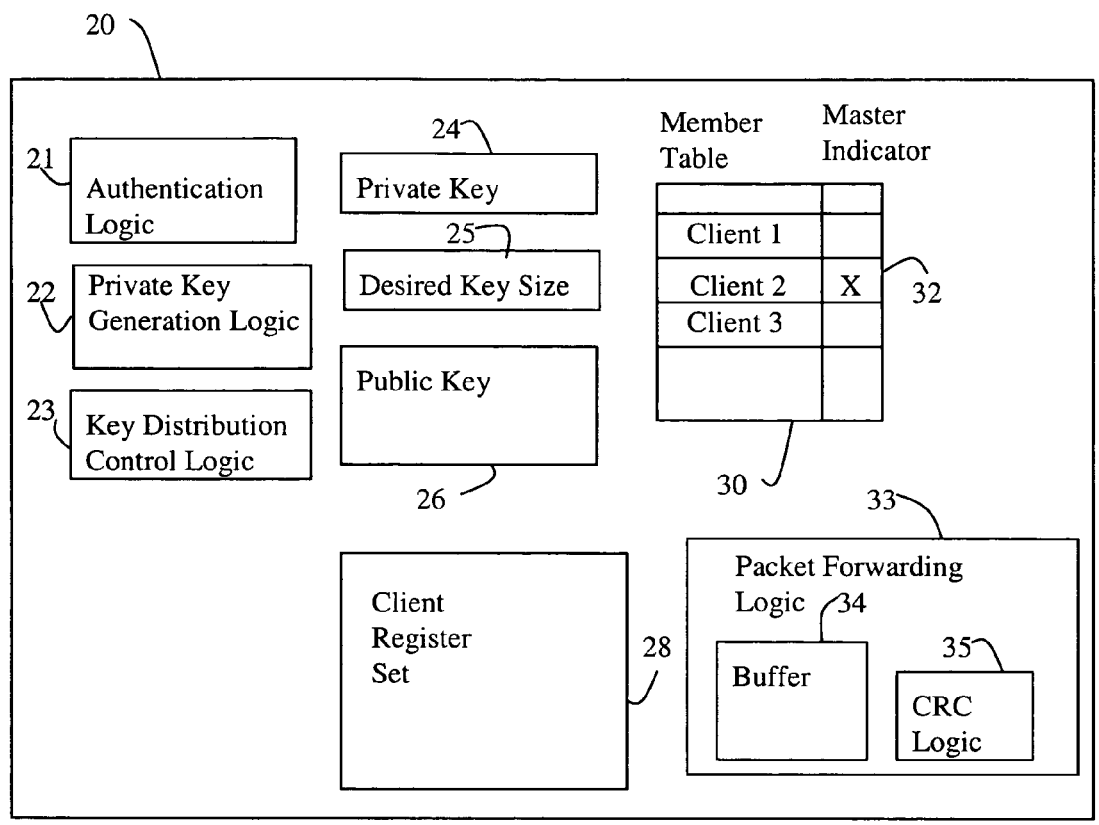
FIG. 8 is a block diagram provided for illustrating several components that may be included in a wireless device capable of operating according to one or more aspects of the present invention.

Referring now to FIG. 8, exemplary components that may be included in a wireless device capable of performing one or more of the processes of the present invention is shown. The device may include authentication logic 21, which is used to perform the functions illustrated in FIG. 4. The device may also include key generation logic 22, used to perform the functionality described with reference to FIG. 5. In addition, the device may also include key distribution logic, used to distribute keys as described with regard to FIG. 6. The logic may be implemented in hardware, software or some combination thereof, and as mentioned above it is not necessary that a client device include all of the logical components.

In a device that uses the key generation and distribution processes of FIGS. 5 and 6, various registers or memory elements are provided. Private key register 24 may be used to store the member private key for WLAN member communication. Register 25 may be used to store a desired key length, when, as described above, the key length is user programmable. Register 26 may be used to store the public key of associated with the device.

A member table 30 is also illustrated. The member table may be used to store various information associated with each other client device in the network, including a MAC address, an SSID, and potentially the symmetric key used by the client to communicate with the associated client. In addition, in one embodiment a bit field may be provided to indicate which of the client devices is the master client device in the WLAN.

Client register set 28 is also provided and used in an embodiment of the invention that uses existing registers that are frequently modified with unpredictable data to generate random keys. Any networking device includes packet forwarding logic 33, which includes logic for packetizing data that is forwarded out of the device and parsing data received by the device. Packet forwarding logic 33 may also include CRC logic, which is used to generate checksum data forwarded out of the device as a CRC, and generate and compare CRCs on received data. In one embodiment of the invention, the CRC generation logic 35 includes logic for interspersing the CRC bits at predefined intervals in the payload to hinder man in the middle attacks as described above. Packet buffer 34 may be used as a temporary storage area as the outgoing packet is constructed.

Accordingly a method and system has been described for securing communication between clients in a WLAN using a combination of client authentication and encryption. Authentication is achieved using a novel physical proximity detection method. Wireless data may be further secured using encryption, and in particular using random keys that are generated using existing unpredictable values in the device.

Having described an exemplary embodiment of the present invention, it will be appreciated that various modifications may be made without diverging from the spirit and scope of the invention. For example, FIGS. 4-6 are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the system may be embodied using a variety of specific command structures. Accordingly, the invention should not be viewed as limited except by the scope and spirit of the appended claims.

The invention claimed is:

1. A method of authenticating a client device for inclusion in a wireless network including the steps of:
    responsive to a user action at the client device and at one other device in the wireless network, determining a distance between the client device and the at least one other device in the wireless network, including transmitting a signal to the client device at less than full power and determining whether the client device responds to that signal; and
    authenticating the client device if the distance is within a preselected range that is less than maximum communication range of the network;
    wherein determining the distance between the client device and the at least one other device includes the steps of waiting for a received a signal from the at least one other device; and wherein the client device is not authenticated if more than one signal is received during the step of waiting including the step of measuring a strength of the signal received from the at least one other device and associating the strength of the signal with a measured distance and determining whether the measured distance is within the predetermined range of distances.

2. The method of claim 1, wherein the user action includes the transmission of the signal to the client device.

3. The method of claim 2, wherein the transmission of a signal to the client device occurs in response to the depression of at least one button on the client device.

4. The method of claim 1, wherein the transmission of a signal to the client device occurs in response to a radio transmission by the user in the proximity of the client device.

5. The method of claim 4, wherein the radio transmission by the user is performed using the at least one other device in the wireless network.

6. The method of claim 4 wherein the at least one other device is a fob.

7. The method of claim 1, wherein the user action includes the disconnection of power from the client device.

8. The method of claim 1, further including the step of identifying a master device in the wireless network.

9. The method of claim 1, further including the step of storing an identifier of the client device and the at least one other device in a table in the client device.

10. An apparatus for authenticating a client device in a wireless network including at least one other device:
   means for detecting a user action at the client device;
   means for receiving, at the client device, a signal transmitted from the at least one other device in response to the user action;
   means for determining a distance between the client device and the at least one other device, including transmitting a signal to the client device at less than full power and determining whether the client device responds to that signal; and
   means for authenticating the client device and the at least one other device if the distance is within a preselected range that is less than maximum communication range of the network;
   wherein means for determining the distance between the client device and the at least one other device includes the steps of waiting for a received a signal from the at least one other device; and
   wherein the client device is not authenticated if more than one signal is received during the step of waiting including the step of measuring a strength of the signal received from the at least one other device and associating the strength of the signal with a measured distance and determining whether the measured distance is within the predetermined range of distances.

11. The apparatus of claim 10, wherein the means for determining a distance operates in response to a strength of the signal.

12. The apparatus of claim 10, wherein the means for authenticating further includes means for determining that only one signal is received by the client device in response to the user action.

13. A wireless device for use in a wireless network, comprising:
   a memory for storing a table of identities of member devices of the wireless network, wherein the identity of each member device is only stored in the table after the member device is authenticated, and wherein each member device is only authenticated if its physical proximity to another member of the wireless network is within a preselected range that is less than maximum communication range of the network during authentication of the respective member;
   wherein determining the distance between the client device and the at least one other device in the wireless network, including transmitting a signal to the client device at less than full power and determining whether the client device responds to the signal, waiting for a received a signal from the at least one other device; and
   wherein the client device is not authenticated if more than one signal is received during the step of waiting including the step of measuring a strength of the signal received from the at least one other device and associating the strength of the signal with a measured distance and determining whether the measured distance is within the predetermined range of distances.

14. In a computer having a memory for storing computer readable program code thereon, a computer program for authenticating a client device for inclusion in a wireless network, the computer program when executed on the computer including the steps of:
   operating responsive to a user action at the client device and at one other device in the wireless network, for determining a distance between the client device and the at least one other device in the wireless network, including transmitting a signal to the client device at less than full power and determining whether the client device responds to the signal; and
   authenticating the client device if the distance is within a preselected range that is less than maximum communication range of the;
   wherein determining the distance between the client device and the at least one other device includes the steps of waiting for a received a signal from the at least one other device; and
   wherein the client device is not authenticated if more than one signal is received during the step of waiting including the step of measuring a strength of the signal received from the at least one other device and associating the strength of the signal with a measured distance and determining whether the measured distance is within the predetermined range of distances.

* * * * *